United States Patent Office 3,507,029
Patented Apr. 21, 1970

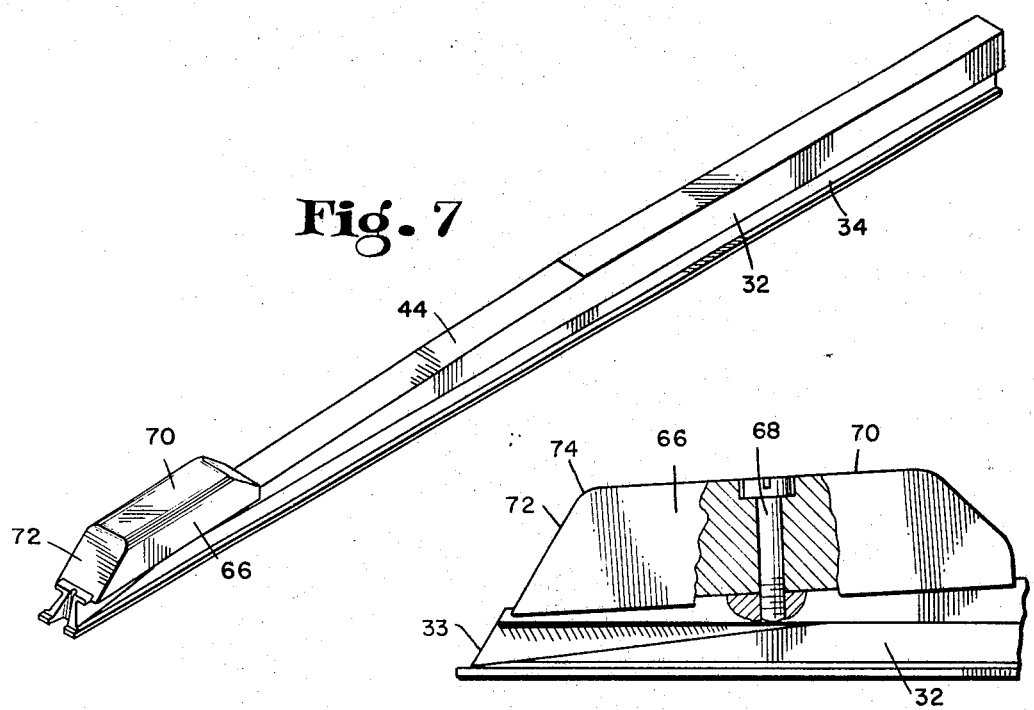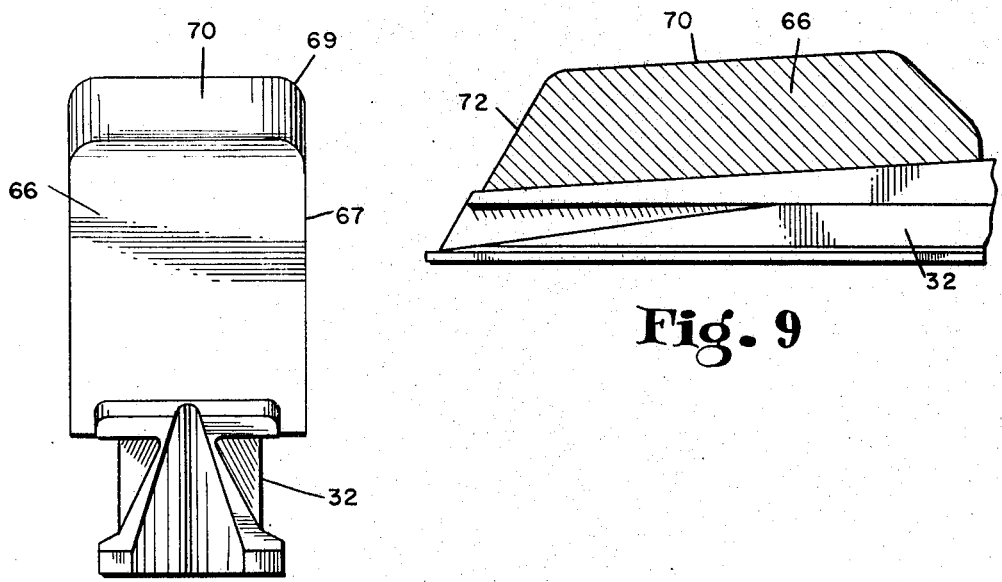

3,507,029
APPARATUS FOR INSERTING COILS AND SLOT WEDGES INTO A CORE MEMBER
Buddy S. Stuckey and Stefan Mannes, Fort Wayne, Ind., assignors to Fort Wayne Tool & Die, Inc., Fort Wayne, Ind., a corporation of Indiana
Filed Oct. 2, 1967, Ser. No. 672,151
Int. Cl. H02k 15/06, 15/09, 15/10
U.S. Cl. 29—205    3 Claims

ABSTRACT OF THE DISCLOSURE

An improved apparatus for inserting coils and slot wedges into a core member wherein the improvement comprises a plurality of coil guiding means arranged to retain and confine the wire forming the sides of a coil in relatively narrow paths immediately prior to insertion of the coil sides into respective slots of the core member thereby to insure insertion of slot wedges over the coil sides, and also to hold and form the rear end turn of the coil radially outwardly thereby to provide clearance for the subsequent insertion of additional coils into the core member. Each forming means comprises a radially outwardly projecting portion carried on a slot wedge guide element, adjacent projecting portions defining relatively narrow, radially extending slots for retaining and confining the wire forming the coil sides, each projecting portion including a radially outer surface about which the rear end turns are formed.

BACKGROUND OF THE INVENTION

Field of the invention

The present invention relates generally to apparatus for inserting prewound coils and slot wedges into the slots of an internally slotted dynamoelectric machine core member, and more particularly to the provision of an improved coil inserting apparatus which is arranged to retain and confine the wire forming the sides of a coil in relatively narrow paths immediately prior to insertion into the slots so as to prevent entry of the slot wedges between wires of the coil sides rather than over the coil sides, and also to hold and form the rear end turns of the coil being inserted into the core member radially outwardly so as to provide clearance for the subsequent insertion of additional coils.

Description of the prior art

In Patent No. 2,432,267 granted Dec. 9, 1947, to A. P. Adamson, there is disclosed an apparatus and method for inserting prewound coils into the slots of an internally slotted dynamoelectric machine core member. Apparatus has been provided in accordance with the Adamson patent, which also inserts slot wedges into the core member slots over the coils inserted therein. See, for instance, Hill Patent No. 3,324,536 which discloses a coil assembling apparatus arranged to insert prewound coils and strips of insulation into the slots of a stator core member.

In accordance with the disclosures of the Adamson and Hill patents, a plurality of elongated fingers are provided, which extend through the bore of the stator core member and respectively engage the inner extremities of the teeth which define the slots of the core member. The coils to be inserted into the stator core member slots are prewound in skein fashion and are positioned on the fingers with one end turn portion of each coil extending across the bore defined by the fingers and with the side portions extending radially outwardly through the spaces defined by respective pairs of fingers. Thus, when the stator core member is positioned on the fingers, i.e., when the stator core member is peripherally surrounding the fingers, the one end turn portion of each coil is in alignment with the bore of the stator core member and the side portions are in alignment with the respective pair of slots, but are inclined outwardly rearwardly with respect thereto and with respect to the axis of the bore. Thus, when the one end turn portion is pushed axially toward the forward end of the bore of the stator core member, the side portions of the coil axially and radially enter the respective slots, the one end turn portion finally being positioned at the forward end of the stator core member and the other end turn portion being positioned at the rear end.

In accordance with the Hill patent, slot wedges to be inserted axially into the core member slots over the coils are positioned in axial alignment with the slots, and the coils and slot wedges are simultaneously moved axially in the direction toward the forward end of the core member so that the slot wedges follow immediately behind the coils and thus axially enter the slots over the side portions thereof.

It has been found during use of the apparatus and method as disclosed in the Adamson and Hill patents that there is a tendency for the wires forming the side portions of the coil to spread or build up near the slot entrance during insertion of the coil, this spreading or build-up being conductive to entry of the slot wedges between turns of the wire rather than completely over the turns forming the side portions of the coil as desired, thus leaving one or more wires outside of the wedge. This tendency is especially evidenced in the case of stator core members having wide, shallow slots.

It is frequently desirable first to insert certain coils, and then subsequently to insert other coils having coil sides occupying the same slots as previously inserted coils, such as in the case of the main and auxiliary windings of single phase motors, or the phase windings of polyphase motors. With the use of the apparatus and method disclosed in the Adamson and Hill patents, when the first coils are inserted as described above, the end turns thereof tend to interfere with the subsequent insertion of additional coils. It has been necessary, therefore, manually to shape or form the end turns of previously inserted coils radially outwardly away from the bore of the stator core member in order to provide clearance for the subsequent insertion of additional coils.

SUMMARY OF THE INVENTION

The improvement of the present invention comprises a plurality of coil guiding means arranged to retain and confine the wire forming the side portions of the coil in relatively narrow paths immediately prior to insertion of the coil into the slots of a stator core member whereby to prevent entry of slot wedges between the wires of the coil sides rather than over the coil sides, each forming means further being arranged to engage the end turns at the rear end of a coil being inserted into the slots of the core member so as to form the rear end turns radially outwardly thereby to provide clearance for the subsequent insertion of additional coils into the slots of the core member. Each forming means comprises a radially outwardly projecting portion carried on a respective slot wedge guide element so as to be adjacent the rear end of the core member, the projecting portions on adjacent wedge guide elements defining relatively narrow, radially outwardly extending slots which retain and confine the wire forming the side portions into relatively narrow predetermined paths thereby preventing the spreading or build-up of the wires forming the side portions nearer the slot entrance and, in turn, inhibiting entrance of the slot wedges between the wires of the side portions rather than over the side portions. Further, each projecting portion includes a radially outer surfaces about which the rear end turns of the coils are formed thereby forming and retaining the rear end turns radially outwardly as the coil is inserted into the core member slots so as to provide clearance for the subsequent insertion of other coils.

In one embodiment of the present invention, the projecting portions are cap members, each of which is integrally formed on the radially outer surface of a respective slot wedge guide element.

In another embodiment of the present invention, the projecting portions are cap members, each of which is removably fastened to the radially outer surface of a respective slot wedge guide element.

It is therefore an object of the present invention to provide an improved apparatus for inserting coils and slot wedges into the slots of a dynamoelectric machine core member wherein the improvement comprises a plurality of coil guiding means, each guiding means being arranged to retain and confine the wire forming the side portions of a coil in relatively narrow paths immediately prior to insertion of the side portions into the slots thereby to facilitate insertion of slot wedges over the coil sides, each guiding means being further arranged to engage the rear end turns of a coil being inserted so as to hold and form the end turns radially outwardly to provide clearance for the subsequent insertion of additional coils into the slots of the core member.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying wherein:

FIG. 7 is a perspective view of a slot wedge guide element embodying the improvement of the present invention;

FIG. 8 is a side view, partly in section, of the forward end portion of the slot wedge guide element of FIG. 7;

FIG. 9 is a fragmentary side elevational view, partly in section, showing another embodiment of the guide element; and FIG. 10 is a forward end view of the guide elements of FIGS. 7, 8 and 9.

DESCRIPTION OF THE PREFERRED EMBODIMENTS

Figure 3:
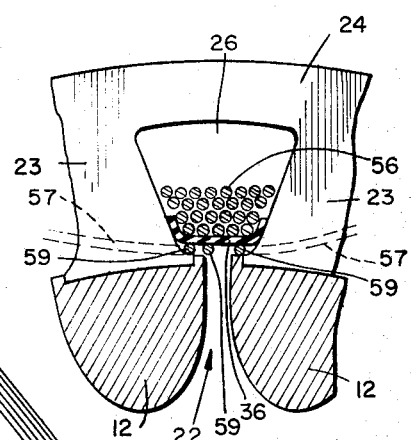
FIG. 3 is a fragmentary illustration, viewed generally along the line 3—3 of FIG. 1, showing one slot with a slot wedge entering between wires of the side portion of a coil as a result of the spreading or build-up tendency shown in FIG. 2.

Referring now to the drawings, the improved coil and slot wedge inserting apparatus of the invention, indicated generally by the reference numeral 10, comprises a plurality of elongated finger elements 12 respectively having their rear ends 14 secured in a mounting assembly 16 and having extension portions 18 which extend axially forwardly from the mounting assembly 16. The finger elements 12 are circularly arranged on the mounting assembly 16 to define a cylindrical bore 20 and are radially spaced apart to define axially and radially extending spaces 22 between respective pairs of finger elements 12. In most instances, the finger elements 12 are radially equally spaced to engage respective teeth 23 of a conventional stator core member 24, which teeth define winding slots 26 therebetween (FIG. 3). Thus, the axially and radially extending spaces 22 between the finger elements 12 respectively communicate with the slots 26 of the core member 24, as shown in FIG. 3.

A plurality of slot wedge guide elements 32 are provided circularly and radially spaced to define a plurality of wedge passages 34. Each guide element 32 is mounted on the mounting assembly 16 to be radially aligned with one of the finger elements 12 and to be in axial alignment with a respective stator core tooth 23. Thus, the passages 34 between respective pairs of guide elements 32 are in axial alignment with and in communication with a respective slot 26 of the core member 24 so that a slot wedge 36 can be inserted through a passage 34 and into a slot 26, the arrow 38 in FIG. 1 indicating the direction of movement of the slot wedge 36. Means, such as that disclosed in the Hill patent, are employed for pushing the slot wedges 36 through the passage 34 and into the slots 26, and need not be further described or illustrated.

Figure 1:
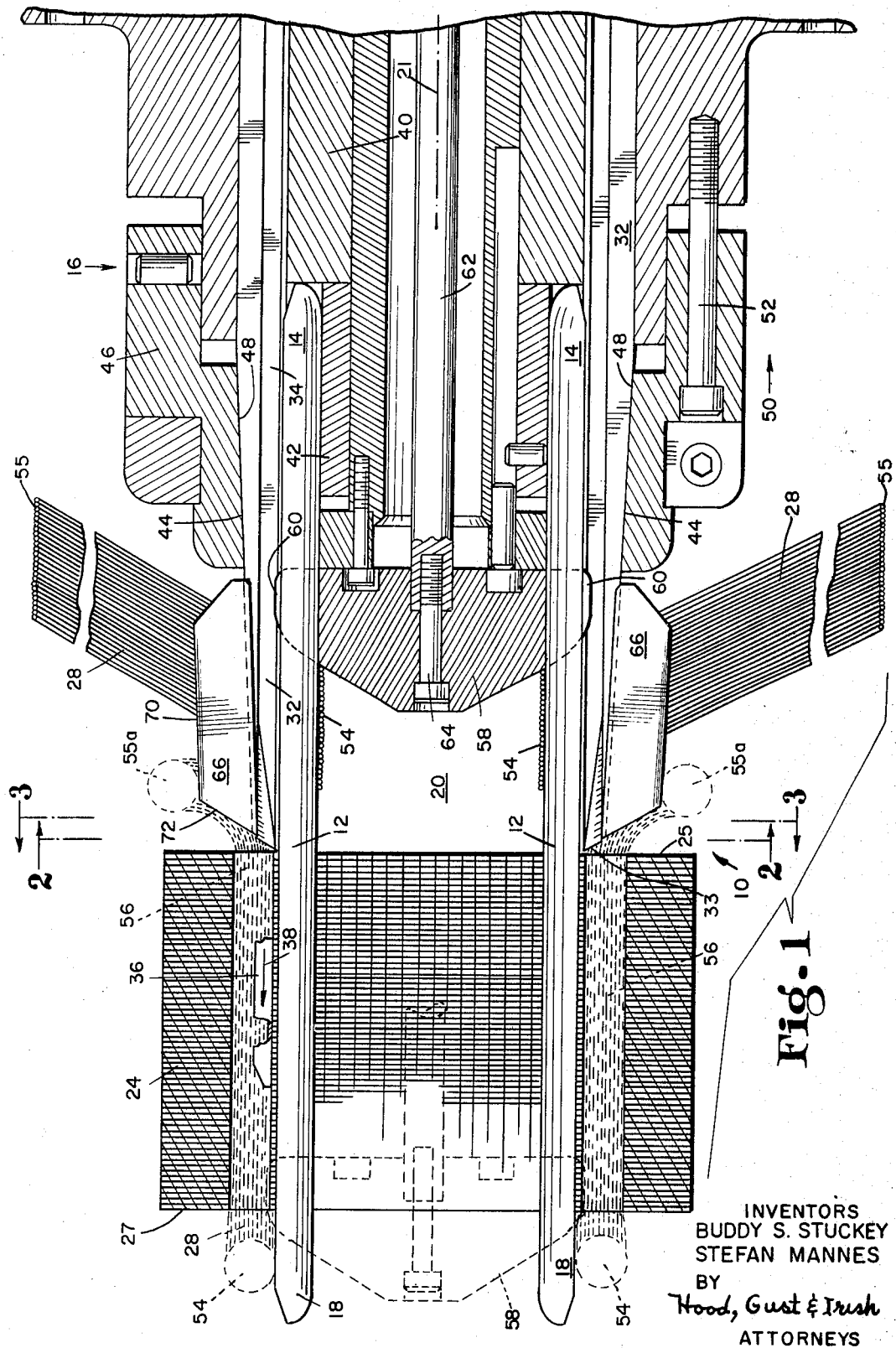
FIG. 1 is a side view, partially in cross section and partly broken away, of a portion of an apparatus for inserting coils and slot wedges, into the slots of a dynamoelectric machine stator core member, the improvement of the present invention being shown embodied in this portion.

As illustrated in FIG. 1, the finger elements 12 and the guide elements 32 are securely fastened in the mounting assembly 16 to extend axially forwardly therefrom so as to permit positioning of the stator core member 24 over the extension portions 18 of the finger elements 12 with its rear end surface 25 in engagement with the tapered forward ends 33 of the wedge guide elements 32. As seen in FIG. 1, the wedge guide elements 32 are equally radially spaced about the periphery of the slotted annular member 40 which forms a part of the mounting assembly 16, and the inner ends 14 of the finger elements are similarly radially spaced about the periphery of another slotted annular member 42 which also forms a part of the mounting assembly 16.

Each of the wedge guide elements 32 is provided with a tapered surface 44 defining a radially outwardly and rearwardly extending face portion as shown in FIGS. 1 and 7. The mounting assembly 16 includes a ring 46 and having a tapered inner surface 48 which peripherally engages the surfaces 44 of the wedge guide elements 32 so that, when the ring 46 is urged in the direction shown by the arrow 50 by means such as the screw 52, each wedge guide element 32 will be tightened against the respective inner end 14 of a finger element 12, thereby tightly to secure both the wedge guide elements 32 and the finger elements 12 in the mounting assembly 16.

Figure 4:
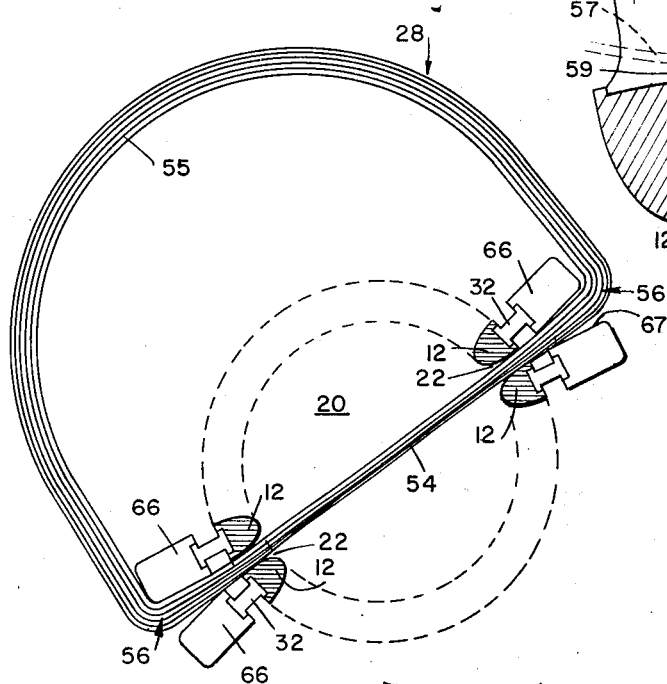
FIG. 4 is a diagrammatic sectional view taken generally along the line 2—2 of FIG. 1 showing the manner in which a prewound coil is positioned on the finger elements of the apparatus of the invention.

The extension portions 18 of the finger elements 12 are adapted to receive the prewound coils 28 to be inserted into the slots 26 of the stator core member 24, the coils 28 conventionally being prewound in skein form as best seen in FIG. 1. Each of the multi-turn, skein-type coils 28 has one end turn portion 54 which extends across the bore 20, as seen in FIG. 4, and side portions 56 which extend radially outwardly through the spaces 22 between the respective pairs of extension portions 18 and the passages 34 between respective wedge guide elements 32. The other end turn portion 55 is thus positioned radially outwardly from the array of finger elements 12 and wedge guide elements 32, as seen in FIGS. 1 and 4. It will be understood that the requisite number of prewound, multi-turn, skein-type coils 28 are positioned on the finger elements 12, following which the stator core member 24 is positioned over the extension portions 18, as shown in FIG. 1.

It will now be seen that the inner end turn portions 54 of the coils 28 (which after insertion will become the forward end turn portions) are arranged to span transversely the bore 20 and the bore of the core member 24, and that the side portions 56 of the coils 28 are in axial alignment with the respective pair of slots 26 of the core member 24, which, in turn are in axial alignment with the respective passages 34 between the wedge guide elements 32, the side portions 56, however, initially extending outwardly and rearwardly away from the slots 26 and the axis 21 of the bore 20.

Conventionally, the axis 21 of the coil inserting apparatus is inclined at an angle generally toward the operator, rather than being directed either verticaly upward or horizontally.

A stripper member 58 is arranged for axial reciprocation in the bore 20 between a position spaced from the rear side 25 of the stator core member toward the mounting assembly 16, as shown in solid lines in FIG. 1 and a second position projecting beyond the forward side 27 of the stator core member 24 as shown in dashed lines. This stripper member 58 has a plurality of radially outwardly extending projections 60 which respectively extend into the spaces 22 between the finger elements 12. Axial movement of the stripper member 58 from the position shown in solid lines in FIG. 1 toward the position shown in dashed lines in a direction shown by the arrow 38 will push the end turn portion 54 of the coil 28 axially along the inner surfaces of the extension portions 18 of the finger elements 12 and axially into and through the bore of the stator core member 24 with the side portions 56 thus progressively radially and axially entering the respective core slots 26 so that, when the stripper member 58 reaches its extreme forward position as shown in dashed lines in FIG. 1, the side portions 56 have been completely inserted in the respective slots 26.

A push rod 62 is connected to the stripper member 58 by means such as the screw 64 so that reciprocation of the push rod will reciprocate the stripper member. Means, not shown, is provided for inserting the slot wedges 36 into the passages 34 and for pushing the slot wedges therethrough, as shown in the Hill patent.

Figure 2:
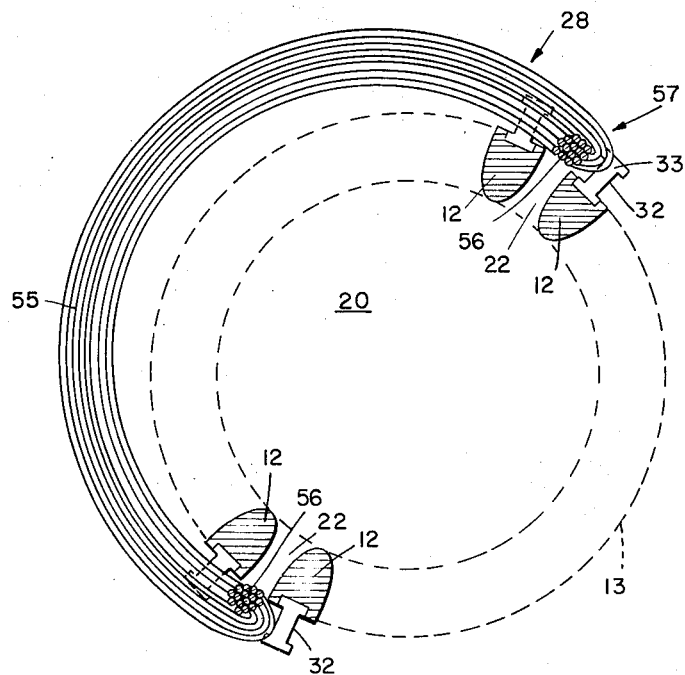
FIG. 2 is a diagrammatic sectional view taken generally along the line 2—2 of FIG. 1, but with the cap members of the invention eliminated, showing the prior tendency for the wires forming the side portions of the coil to spread or build up near the entrances of the slots.

Referring now to FIG. 2 in which two pairs of diametrically opposite finger elements 12 and wedge guide elements 32 are shown, it being understood that a complete circular array of finger elements and wedge guide elements is provided, as shown by the dashed lines 13. It has been found that with the apparatus disclosed in the Hill patent, and particularly in the case of a stator core member having relatively shallow, wide slots 26 of the type shown in FIG. 3, as the stripper member 58 is moved forwardly in the direction shown by the arrow 38 thereby to begin insertion of the side portions 56 of the coil 28 into the respective slots 26 of the stator core member 24, there is a tendency for the wires forming the side portions 56 to spread or build-up near the entrance to the respective slot, between the rear face 25 of the core member and the tapered forward end 33 of the wedge guide elements, as shown at 57 in FIG. 2. Recalling now that the wedges 36 are pushed axially in the direction shown by the arrow 38 so that they enter and progressively move forwardly through the slots 26 immediately following the progressive insertion of the side portions 56 of the coil, as a result of this spreading or build-up tendency of the wire forming the side portions 56 near the entrances of the respective slots, there is a tendency for the wedges 36 to enter between some of the wires forming the side portions, rather than completely over the side portions, as shown in FIG. 3. Thus, one or more of the wires forming the side portions 56 may be disposed under the wedges 36, as shown at 59 in FIG. 3. This condition is obviously very undesirable since, if another coil is to be inserted in the same slot over the previously inserted coil, the proper insulation between coils is not provided and arc-over may result, and if the coil is the only coil in the slot or the last coil positioned therein, the wires 59 which are positioned over the slot wedge 36 may enter the bore, a completely untenable condition.

The improvement of the present invention comprises a plurality of coil guiding means arranged to retain and confine the wire forming the side portions 56 of the coil immediately prior to insertion into the slot thereby preventing the above-described spreading or build-up tendency, these coil guiding means also being arranged to engage the rear end turns 55 of the coils so as to hold and form the end turns radially outwardly relative to the bore of the core member 24 so as to provide clearance for the subsequent insertion of additional coils into the slots 26. Specifically, at least some of the slot wedge guide elements 32, in some instances all of the wedge guide elements, are respectively provided with a radially outwardly projecting portion 66 at the forward end, i.e., the end adjacent the core member 24, as shown in FIG. 1.

Referring now specifically to FIGS. 7, 8, 9 and 10, the projecting portion 66 may be integrally formed on guide element 32, as suggested in FIG. 9, or alternatively, the projecting portion 66 may be a cap-like member which is silver-soldered, or otherwise securely and permanently fastened to the forward end of a respective guide element 32. It may not be necessary or desirable to provide a projecting portion 66 on each slot wedge guide element 32, and therefore, the projecting portions 66 may be removably fastened to selected guide elements 32 by means such as screws 68, as suggested in FIG. 8.

In all of the illustrated embodiments, the projecting portion 66 includes a radially outer surface 70 joined to the side surfaces 67 by smoothly curved radii 69. Each projecting portion 66 is also provided with a forward and inclined surface 72 which joins the outer surface 70 with a smoothly curved radius 74. The radii 69, 74 are provided so that the coils being inserted are not subject to sharp edges which would scrape the insulation on the wires while the inclined surfaces 72 provide clearance for the end turns after insertion.

Figure 5:
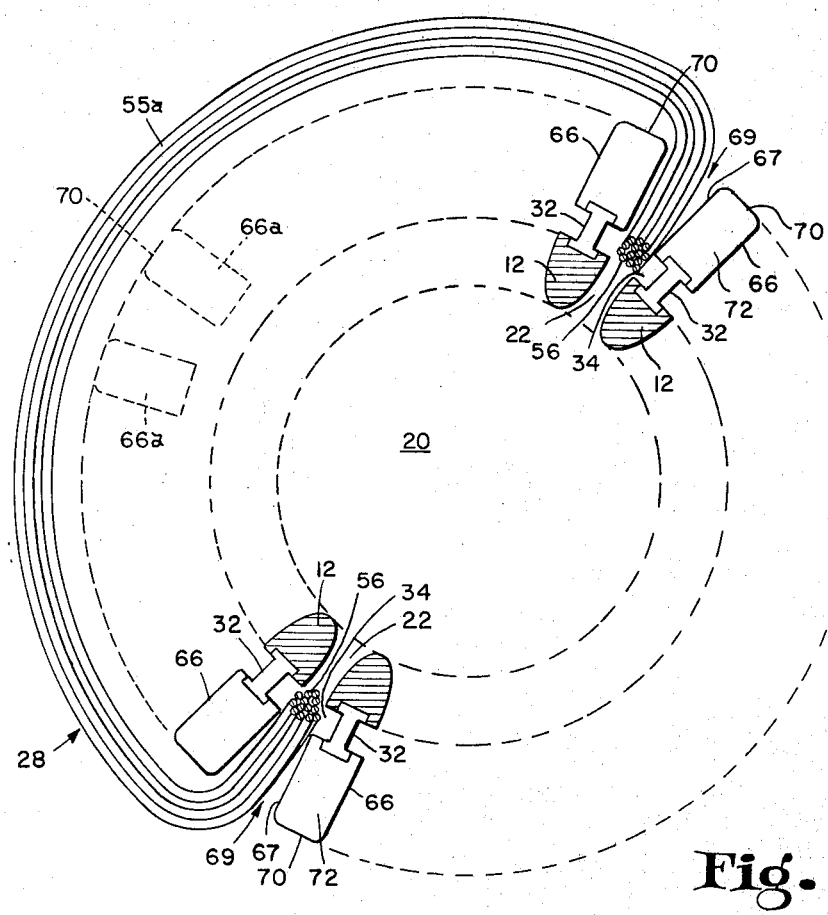
FIG. 5 is a view similar to FIG. 4 showing the coil in generally the same position as that shown in FIG. 2 and showing the manner in which the projecting portions of the invention inhibit the aforementioned spreading or build-up tendency.
Figure 6:
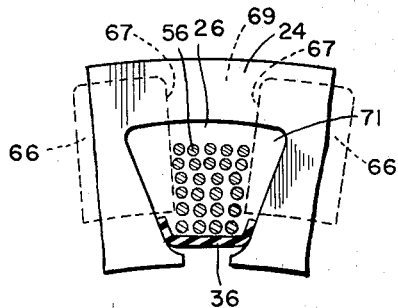
FIG. 6 is a fragmentary view similar to that shown in FIG. 3 and further showing the function of the projecting portions in retaining and confining the wire forming the side portions.

Reference to FIGS. 4 and 5, and a comparison of these figures with FIG. 2, will now reveal that the side surfaces 67 of adjacent projecting portions 66 define relatively narrow, radially outwardly extending passages 69 which retain and confine the wire forming the side portions 56 of the coil 28 in a relatively narrow path immediately prior to insertion into the slots, thereby eliminating the spreading or build-up tendency above-described, as shown in FIG. 2. With this spreading or build-up tendency eliminated, the slot wedge 36 enters over the side portions 56 of the coils in the slots 26 rather than tending to enter between the wires, as previously described. As indicated above, in the case of shallow wide slots, as shown in FIGS. 3 and 6, there is a greater tendency for the wire forming the side portions 56 to spread or flare out, and it is difficult to force the wire into the outer corners 71 of the slots. The projecting portions 66 have the effect of narrowing and elongating the slots 26 thus prevening the spreading or flaring-out of the wire, and further tending to move the wire forming the side portions 56 toward the bottom or outer portion of the slot so that it will more readily move into the corners 71 upon the subsequent in sertion of another coil in the same slot, thus making it possible to provide greater slot fill.

Referring now particularly to FIG. 5, it wil be seen that after the coil 28 has been fully inserted in the slots 26 as above described, the rear end turn 55 will be formed away from the bore 20 by the projections 66, as shown in dashed lines at 55a in FIGS. 1 and 4. It will be understood that other wedge guide elements 32 of the complete circle of wedge guides will have projecting portions 66 thereon which cooperate to form the end turns 55a, two of such additional projecting portions being shown in dashed lines at 66a in FIG. 5. Because of this outwardly formed condition of the rear end turns 55a on the rear side 25 of the stator core 24, the forming of the end turns 55a prior to insertion of a second coil becomes much less severe and in some cases completely unnecessary.

It will be readily understood that the projecting portions 66 of the present invention may be employed in connection with the insertion of both the main and auxiliary windings of single phase motors, and also for the insertion of the windings of polyphase stators where two or more coil sides may be inserted in a single slot.

While there have been discussed above the principles of this invention in conjunction with specific apparatus, it is to be clearly understood that this description is made by way of example and not as a limitation to the scope of the invention.

What is claimed is:

1. An improved coil and slot wedge inserting apparatus of the type comprising a mounting member, a plurality of elongated, axially extending finger elements connected to said mounting member, said finger elements being circularly arranged on said mounting member to define a bore and radially arranged to define axially extending spaces therebetween, the outer surfaces of the free ends of said finger elements being adapted to engage the inner extremities of the slot-defining teeth of a circular core member arranged peripherally about said finger elements, the spaces between said finger elements being in radial alignment with and in communication with respective slots in such core member; a stripper member arranged for axial reciprocation in said bore to push a prewound coil encircling at least two of said finger elements along the inner surfaces of said elements axially through such core member whereby the side portions of such coil are inserted into respective slots of such core member; and a plurality of elongated, axially extending slot wedge guide elements connected to said mounting member, each of said guide elements being radially aligned with one of said finger elements and disposed radially outwardly of said finger element, said guide elements defining spaces therebetween in axial alignment with and communicating with respective slots in such core member thereby to guide slot wedges inserted axially into said slots; and wherein the improvement comprises a plurality of coil guiding means, adjacent pairs of said guiding means respectively defining relative narrow, radially outwardly extending slots for retaining and confining the wire forming the side portions of a coil being inserted into the slots of such core member in relatively narrow paths immediately prior to insertion, each of said guiding means being further arranged to engage the end turns of a coil being inserted into the slots of said core member thereby to hold and form said end turns radially outwardly to provide clearance for the subsequent insertion of at least one additional coil into said slots of said core member.

2. An improved coil and slot wedge inserting apparatus of the type comprising a mounting member, a plurality of elongated, axially extending finger elements connected to said mounting member, said finger elements being circularly arranged on said mounting member to define a bore and radially arranged to define axially extending spaces therebetween, the outer surfaces of the free ends of said finger elements being adapted to engage the inner extremities of the slot-defining teeth of a circular core member arranged peripherally about said finger elements, the spaces between said finger elements being in radial alignment with and in communication with respective slots in such core member; a stripper member arranged for axial reciprocation in said bore to push a prewound coil encircling at least two of said finger elements along the inner surfaces of said elements axially through such core member whereby the side portions of such coil are inserted into respective slots of such core member; and a plurality of elongated, axially extending slot wedge guide elements connected to said mounting member, each of said guide elements being radially aligned with one of said finger elements and disposed radially outwardly of said finger element, said guide elements defining spaces therebetween in axial alignment with and communicating with respective slots in such core member thereby to guide slot wedges inserted axially into said slots; and wherein the improvement comprises a plurality of coil guiding means, adjacent pairs of said guiding means respectively defining relative narrow, radially outwardly extending slots for retaining and confining the wire forming the side portions of a coil being inserted into the slots of such core member in relatively narrow paths immediately prior to insertion, each said guiding means comprising a radially outwardly projecting portion carried on a respective one of said guide elements to be adjacent the end of said core member which faces said mounting member, each said projecting portion including a radially outer surface for engaging the end turns of a coil being inserted into the slots of said core member thereby to hold and form said end turns radially outwardly to provide clearance for the subsequent insertion of at least one additional coil into said slots of said core member.

3. An improved coil and slot wedge inserting apparatus of the type comprising a mounting member, a plurality of elongated, axially extending finger elements connected to said mounting member, said finger elements being circularly arranged on said mounting member to define a bore and radially arranged to define axially extending spaces therebetween, the outer surfaces of the free ends of said finger elements being adapted to engage the inner extremities of the slot-defining teeth of a circular core member arranged peripherally about said finger elements, the spaces between said finger elements being in radial alignment with and in communication with respective slots in such core member; a stripper member arranged for axial reciprocation in said bore to push a prewound coil encircling at least two of said finger elements along the inner surfaces of said elements axially through such core member whereby the side portions of such coil are inserted into respective slots of such core member; and a plurality of elongated, axially extending slot wedge guide elements connected to said mounting member, each of said guide elements being radially aligned with one of said finger elements and disposed radially outwardly of said finger element, said guide elements defining spaces therebetween in axial alignment with and communicating with respective slots in such core member thereby to guide slot wedges inserted axially into said slots; and wherein the improvement comprises a plurality of coil guiding means, adjacent pairs of said guiding means respectively defining relative narrow, radially outwardly extending slots for retaining and confining the wire forming the side portions of a coil being inserted into the slots of such core member in relatively narrow paths immediately prior to insertion, each said guiding means comprising a radially outwardly projecting portion carried on a respective one of said guide elements to be adjacent the end of said core member which faces said mounting member, each said projecting portion further including a face portion inclined radially outwardly and away from said end of said core member, said face portion being at the end of said projecting portion which is adjacent said core member.

(References on following page)

References Cited

UNITED STATES PATENTS

| | | | | |
|---|---|---|---|---|
| 2,272,263 | 2/1942 | Cullin | 29—205 |
| 2,432,267 | 12/1947 | Adamson | 29—596 |
| 2,703,923 | 3/1955 | Caldwell | 29—205 |
| 2,814,096 | 11/1957 | Herbrecht | 29—596 X |
| 2,819,514 | 1/1958 | Polard | 29—606 |
| 2,959,845 | 11/1960 | Johnson | 29—203 |
| 2,967,346 | 1/1961 | McMaster | 29—596 |
| 3,324,536 | 6/1967 | Hill | 29—205 |
| 3,340,029 | 9/1967 | Eminger | 29—205 |
| 3,377,690 | 4/1968 | Eminger | 29—205 |
| 3,402,462 | 9/1968 | Walker | 29—606 X |
| 3,432,907 | 3/1969 | Larsen | 29—205 |
| 3,447,225 | 6/1969 | Eminger | 29—205 |

FOREIGN PATENTS 665,502    6/1963    Canada.

WAYNE A. MORSE, JR., Primary Examiner

U.S. Cl. X.R.

29—596, 606